Patented Nov. 1, 1932

1,885,887

UNITED STATES PATENT OFFICE

GEORGE D. BEAL AND ROB ROY McGREGOR, OF PITTSBURGH, PENNSYLVANIA, ASSIGNORS TO MELLON INSTITUTE OF INDUSTRIAL RESEARCH, A CORPORATION OF PENNSYLVANIA, TRUSTEE

METHOD OF CARROTING FUR

No Drawing. Application filed July 16, 1930. Serial No. 468,449.

Our invention relates to the treatment of animal fibers, such as fur, in preparation for its manufacture into felt. It has been developed in the treatment of fur, and in that application we shall describe it. The objects in view are improvement in the quality of the product, reduction in the cost of production, and avoidance of manufacturing conditions such as to affect the health of operatives. The preponderant use for fur felt is in the making of hats. This application is in part a continuation of an application filed by us May 18, 1929, Serial No. 364,317 now abandoned.

For the preparation of fur for felt manufacture it has long been the practice to treat rabbit, hare, beaver, and similar types of fur with a solution of mercuric nitrate in nitric acid, either while still on the pelt or after removal therefrom. The fur is then dried at temperatures ranging from room temperature to as high as 250° F., depending on the nature of the fur and the type of final product desired. The process is known as carroting.

There are certain disadvantages connected with the process, among which the most obvious are the toxicity of the mercury and the discoloration effected by the nitric acid; also, varying results are obtained under varying atmospheric conditions, due to the fact that the nitric acid is volatile. This property of nitric acid results in a quick evaporation of the nitric acid on days of low relative humidity and slow evaporation on days of high relative humidity. On days of low relative humidity much of the nitric acid may evaporate before reacting with the fur, and on days of high relative humidity the time of reaction of the acid with the fur may be so greatly prolonged as to give a decidedly yellow color to the fur, regardless of the temperature of drying.

It is evident that there is a need for a carroting solution which will do away with the difficulties consequent upon the use both of mercury and of nitric acid.

We have made an extensive study of the reactions of carroting solutions upon fur, and have found that, in order to obtain the best results, two reactions must take place. The first reaction is that of oxidation, and in the mercuric nitrate-nitric acid solution this reaction is carried out by the mercury catalytically and by the nitric acid by direct oxidation. The second reaction is that of hydrolysis of the fur, to allow the oxidizing agent to penetrate and to carry out its function more readily and completely. In the solution in common use this function devolves on the nitric acid. But this acid is far from being consistent, due to the fact that part of it is expended in oxidation and nitration, and its time of contact with the fur varies according to the temperature of drying and according to the degree of humidity of the atmosphere.

We have found as a result of many experiments that neither oxidation alone nor hydrolysis alone is sufficient to give a good carroting effect. The use of hydrogen peroxide, or of potassium permanganate, or of similar oxidizing agents, does give a certain carroting effect, but not nearly sufficient to be of commercial value. Hydrolysis by the use of sulphuric acid, or of hydrochloric acid, or of steam under pressure, also achieves a certain carroting effect, but not sufficient to be of commercial value. The combination of these two reactions, however, brings about a carroting reaction which is complete and which affords a carroted fur capable of being worked faster and of better quality than fur treated with mercury solution. The improvement of our process upon the mercury solution process is, without doubt, due to our use of a proper hydrolyzing agent.

We have found that the best results are obtained by the use of an oxidizing agent which is readily available, accompanied by a hydrolizing acid which is not volatile at the temperature at which the carroted fur is dried, and which is not consumed by the fur substance through oxidation reactions on the part of these acids at temperatures not exceeding the temperatures at which the fur is dried.

As oxidizing agent we may use such acids as chloric, bromic, iodic, or permanganic. We prefer to use chloric for reasons of economy and of ease of preparation. As hydrolyzing agent we may use such acids as sulphuric, or phosphoric, or any highly ionized acid which is not volatile at the temperature of drying and which may not be consumed by side reactions during the processing. We prefer to use sulphuric acid.

As an example of our method, we prepare a solution of chloric acid by adding 24.5 grams if sulphuric acid to 80.5 grams of barium chlorate previously dissolved in 1000 cc. of water. A further 36 grams of sulphuric acid are then added; and the solution is filtered, to remove the barium sulphate. The filtered solution is then ready to be applied to the fur.

As a second example, we dissolve 80.5 grams of barium chlorate in approximately 800 cc. of water. To this is added a sufficient quantity of a solution of a silver salt, for example, of a silver nitrate solution or of a silver sulphate solution, to precipitate any chlorides present, and no more. 24.5 grams of sulphuric acid are then added (sufficient to free the chloric acid from the barium chlorate), and then an additional 36 grams of sulphuric acid are added. Water is added to bring the total volume to 1000 cc., and the solution filtered to remove the barium sulphate and silver chloride. The filtered solution is then ready to be applied to the fur.

After the fur has been treated it is dried, the fur removed from the pelt, and it then is ready for the operations of blowing and hatmaking. The fur so prepared has been found to be faster working than mercury-carroted fur, and the finished felt has a finer feel and more brilliant sheen.

The concentrations of chloric acid and sulphuric acid may vary widely, according to the nature of the fur being treated and to the method of drying. The amount of barium chlorate required per 1000 cc. may vary from 40 grams to 160 grams. The amount of sulphuric acid in excess of that required to free the chloric acid may vary from 15 grams to 60 grams per 1000 cc. Different types of fur and different types of drying call for different concentrations of both chloric and sulphuric acid, and the best proportions may be found only by test.

We claim as our invention:

1. The method herein described of simu'taneously hydrolyzing and oxidizing fur fiber in preparation for felting which consists in treating the fiber with an oxidizing agent, together with a hydrolyzing acid which is not volatile at the temperature at which the carroted fur is dried, and which within the range of temperatures experienced is not consumed by oxidation reactions with the fur, the oxidizing agent being present in quantity not less than 3.36 per cent. and the hydrolyzing agent being present in free and uncombined state.

2. The method herein described of simultaneously hydrolyzing and oxidizing fur fiber in preparation for felting which consists in treating the fiber with chloric acid, together with a hydrolyzing acid which is not volatile at the temperature at which the carroted fur is dried, and which within the range of temperatures experienced is not consumed by oxidation reactions with the fur, the chloric acid being present in a quantity not less than 3.36 per cent. and the hydrolyzing agent being present in free and uncombined state.

3. The method herein described of simultaneously hydrolyzing and oxidizing fur fiber in preparation for felting which consists in treating the fiber with chloric acid together with sulphuric acid, the chloric acid being present in quantity not less than 3.36 per cent. and the sulphuric acid being present in quantity not less than 2 per cent.

4. The method herein described of simultaneously hydrolyzing and oxidizing fur fiber in preparation for felting which consists in treating the fiber with a solution of chloric acid together with sulphuric acid, the sulphuric acid being present in a quantity not less than 20 grams per 1000 cubic centimeters of solution.

In testimony whereof I have hereunto set my hand.

GEORGE D. BEAL.

In testimony whereof I have hereunto set my hand.

ROB ROY McGREGOR.